UNITED STATES PATENT OFFICE 2,502,748

PRODUCTION OF MAGNESIUM PHTHALOCYANINE

John L. Porter, Palo Alto, Calif., assignor to Kaiser Aluminum & Chemical Corporation, a corporation of Delaware No Drawing. Application January 3, 1947, Serial No. 720,105

9 Claims. (Cl. 260—314.5)

This invention relates to the preparation of magnesium phthalocyanine. The invention is particularly concerned with a process wherein a compound chosen from the group phthalic anhydride, phthalimide and phthalamide is reacted with a magnesium derivative of ammonia, to form magnesium phthalocyanine.

According to the present invention it has been discovered that a blue pigment, the magnesium compound of phthalocyanine, is formed when a substance such as phthalic anhydride, phthalimide or phthalamide is reacted with a magnesium derivative of ammonia. The term "magnesium derivative of ammonia" as used in this specification and the appended claims is intended to mean a compound in which one or more valences of the nitrogen of ammonia are satisfied by magnesium, that is, magnesium nitride, magnesium imide or magnesium amide. Suitably the reactants are mixed together in the solid state and heated to the melting point of the lower, or lowest, melting constituent, or to slightly above such melting point, to bring about the reaction.

Preferably the magnesium nitride, magnesium imide or magnesium amide is in extremely finely divided form. It is found during the reaction that the pigment forms at the surfaces of such magnesium reactant particles, where this reactant is in contact with the phthalic anhydride, phthalimide or phthalamide. As a coating of the pigment builds up, the reaction is slowed or even, eventually stopped. Therefore it has been found advantageous, in one method of working, to avoid this effect by reacting phthalimide or phthalamide with, for example, very finely divided nitride prepared as described in my co-pending application, Serial No. 571,074, filed January 2, 1945, now U. S. Patent 2,487,474. It is also advantageous in overcoming the above described "coating" effect to react the phthalimide or phthalamide with nitrided finely divided magnesium-bearing powder prepared as described in the co-pending application of Alva C. Byrns, Serial Number 577,586, filed February 12, 1945, now U. S. Patent 2,497,583.

However, in still another method of working, the phthalic anhydride, phthalimide or phthalamide is reacted with the magnesium reactant, which may not be in such finely divided state, substantially to completion, by heating the compounds together while agitating in a ball mill, or similar device, whereby the coating is mechanically removed, as by being knocked off or rubbed off as it is formed, and fresh surfaces of the magnesium reactant are exposed to the phthalic anhydride, phthalamide or phthalimide.

The mixture of reactants is heated to initiate the reaction, as stated above, but the reaction, once started, is exothermic and it is preferred to maintain the temperature during reaction at not over about 300° C., as otherwise charring and the formation of some breakdown products occurs. The reaction in general is initiated at about the melting point of the phthalimide or phthalamide, although sometimes it is advantageous to heat the molten compound to somewhat above its melting point before adding the magnesium compound. In general, the best yields, quantitatively, are obtained when the temperature of the reaction between phthalic anhydride, phthalamide or phthalimide and a magnesium derivative of ammonia as described above is maintained at from about 260° C. to about 300° C. after initiation of the reaction. The reaction mixture is agitated while molten to insure thorough mixing of the reactants.

The mechanism of the reaction is not thoroughly understood but it appears to be advantageous to conduct the reaction in a closed space, as in a bomb or, as before mentioned, in a ball mill or similar device. It is believed that the yield may be thereby increased for the reason that ammonia developed in situ in the initial stages of the reaction is available for completion of the conversion. The reaction can be conducted under ordinary or increased pressures. In this reaction it is essential that the nitrogen atom of at least one of the reactants have a hydrogen atom attached thereto.

When reacting melted phthalic anhydride, phthalimide or phthalamide with the magnesium reactants described, the product of the reaction is a solid and, in general, the reaction is finished when the reaction mass has solidified, although heating may be continued for a time thereafter to insure completion. The reaction product is usually contaminated with some unreacted starting materials and also probably with products of undesired side-reactions which may occur. It is purified, if desired, by treatment with strong alkaline solution and then with a dilute acid solution, if desired with heating.

While the reaction between the compounds described proceeds very well as described above without the use of a solvent or diluent, the reaction can also be carried out in the presence of a polar solvent, for instance, nitrobenzene, when magnesium imide or magnesium amide is the magnesium-containing reactant.

Following are examples which illustrate modes of carrying out this invention.

Example 1

0.5 mol of finely divided magnesium nitride, obtained by reacting magnesium vapor at a temperature of about 900° to 1120° C., with nitrogen or ammonia gas, is mixed with 1.0 mol of phthalimide and placed in a reaction vessel. The vessel is heated in an oil bath until the imide melts (or about 240° C.). When the temperature is about 240° C., the reaction begins and the temperature rises more rapidly, whereupon cooling oil is flowed through the bath to hold the temperature at about 280° C. The reaction mass slowly solidifies and is heated at from about 280° C., to not over 300° C., for about one hour after solidification appears to be complete.

The pigment mass contains some contaminating, or undesired, substances and is purified by grinding the mass, adding a washing amount of 5N aqueous solution of KOH, stirring well, filtering to recover the solid, adding to the solid in a suitable container a washing amount of dilute aqueous hydrochloric acid, heating on a water bath to hasten conversion of any remaining nitride, and filtering to obtain the purified pigment. The washing with caustic is repeated once more, followed by another washing with acid, and there is obtained the purified blue pigment, magnesium phthalocyanine, of excellent color and strength.

Example 2

29.43 parts by weight of phthalimide, 3.93 parts by weight of magnesium imide and 10.10 parts by weight of magnesium nitride are mixed together and heated in a suitable container in an oil bath. The reaction begins at about 240° C., and the temperature then rises and is maintained at about 270° C. Solidification occurs in about 15 minutes and the temperature is held at about 270° C., for a total of 3 hours. The solid reaction product is purified as in Example 1, and there are recovered 14 parts by weight of washed, extracted pigment, which is a 54% yield.

Example 3

45 parts by weight of phthalimide and 26.5 parts by weight of finely divided magnesium imide material are placed in a flask and heated in an oil bath. The magnesium imide material is prepared by reacting ammonia with the crude magnesium dust condensate recovered in the well-known carbothermic process (this process being described by Hansgirg in U. S. 1,884,993, and by others). The magnesium imide material contains, beside 68% of magnesium imide, about 7.5% of carbon, along with some magnesium oxide.

Upon heating the mixture of phthalimide and magnesium imide material, a green melt is obtained when the temperature of the mixture reaches 245° C. The reaction begins at this point and the temperature within the mixture rises in about one minute to 260° C., with conversion of the mixture to a blue solid. After solidification, heating is continued for a total time of 50 minutes, whereupon the temperature of the oil bath rises to 265° C., while the temperature of the mixture remains at around 260° C. A good yield of solid magnesium phthalocyanine pigment is obtained upon purification.

Example 4

33 parts by weight of phthalamide and 12 parts by weight of magnesium nitride are placed in a pressure bomb and heated to 250° C., for about one hour. The yield of pigment is about 22%, based on the phthalamide starting material.

In general, in the above described reactions, the reactants are brought together in approximately stoichiometric proportions, although it may sometimes be advantageous to have an excess of the magnesium compound present. Mixtures of two or more of the magnesium compounds can be employed as the magnesium-containing component of the reaction mixture. For instance, phthalimide can be reacted with a mixture of magnesium nitride and magnesium imide. Ammonium phthalate can also be used in the method of this invention as it apparently breaks down upon heating to yield phthalimide and water, and thus phthalimide is the effective reactant in the preparation of the pigment. In the purification of the solid reaction product, the treated product can be separated from the washing liquid by filtration or by decantation, or the solid reaction product can be separately recovered in any other desired manner.

In another mode of operation, phthalic anhydride is reacted with magnesium imide in the proportion of one mol of the former to two, or slightly more than two, mols of the latter. Reaction begins at about 200° C., forming magnesium phthalocyanine. Phthalic anhydride is also reacted with magnesium amide, in the proportion of one mol of the phthalic anhydride to about one mol, or a little more, of the magnesium amide, to form magnesium phthalocyanine. In this case it is preferred to heat the molten anhydride to about 250° C., and then to add the amide.

The above examples and detailed description have been given for purposes of illustration only and it is to be understood that variations and modifications may be made therein without departing from the spirit and scope of the invention as defined in the appended claims.

What I claim is:

1. Process of producing magnesium phthalocyanine which comprises fusing a compound chosen from the group consisting of phthalic anhydride phthalimide and phthalamide in admixture with at least one compound chosen from the group consisting of magnesium amide, magnesium imide and magnesium nitride, so selecting the reacting components that at least one of them contains a nitrogen atom having at least one hydrogen attached thereto, thereafter maintaining the reaction temperature at from about 260° C., to about 300° C., until reaction is completed, grinding the solid reaction product, treating said ground product with strong aqueous potassium hydroxide solution, filtering to recover said treated ground product, treating said recovered product with dilute aqueous hydrochloric acid solution with heating, and filtering to recover the purified pigment.

2. Process of producing magnesium phthalocyanine which comprises admixing finely divided magnesium nitride with phthalimide, heating the mixture to melt the phthalimide, and thereafter maintaining the temperature of the reaction mixture at from about 280° C., to about 300° C., until reaction is completed.

3. Process of producing magnesium phthalocyanine which comprises admixing phthalimide with finely divided magnesium imide, heating the mixture to melt the phthalimide and to initiate the reaction and then maintaining the temperature of the mixture at about 260° to 300° C., for a total time of about one hour.

4. In the process of producing magnesium phthalocyanine the steps which comprise fusing phthalic anhydride, adding magnesium amide thereto, and maintaining the reacting mixture at a temperature not exceeding about 300° C.

5. In the process of producing magnesium phthalocyanine the step which comprises reacting a fused compound chosen from the group consisting of phthalimide, phthalamide and phthalic acid anhydride with at least one compound chosen from the group consisting of magnesium amide, magnesium imide and magnesium nitride, so selecting the reacting components that at least one of them contains a nitrogen atom having at least one hydrogen attached thereto.

6. In the process of producing magnesium phthalocyanine the step which comprises fusing a compound chosen from the group consisting of phthalic anhydride, phthalimide and phthalamide in admixture with at least one finely, divided compound chosen from the group consisting of magnesium amide, magnesium imide and magnesium nitride, while so selecting the reacting components that at least one of them contains a nitrogen having at least one hydrogen attached thereto.

7. In the process of producing magnesium phthalocyanine the steps which comprise fusing a compound chosen from the group consisting of phthalic anhydride, phthalamide and phthalimide in admixture with at least one compound chosen from the group consisting of magnesium amide, magnesium imide and magnesium nitride, so selecting said reactants that at least one contains a nitrogen atom having at least one hydrogen attached thereto, and continuously mechanically removing from the particles of said compound the pigment formed thereon.

8. In the process of producing magnesium phthalocyanine pigment the steps which comprise melting a compound chosen from the group consisting of phthalic anhydride, phthalamide and phthalimide in admixture with at least one compound chosen from the group consisting of magnesium amide, magnesium imide and magnesium nitride, so selecting said reactants that at least one contains a nitrogen atom having at least one hydrogen attached thereto, and milling said admixture to continuously remove pigment coating formed on the solid particles of said compound.

9. In the process of producing magnesium phthalocyanine the steps which comprise fusing a compound chosen from the group consisting of phthalic anhydride, phthalamide and phthalimide in admixture with at least one compound chosen from the group consisting of magnesium amide, magnesium imide and magnesium nitride, so selecting said reactants that at least one contains a nitrogen atom having at least one hydrogen attached thereto, and then maintaining the reaction temperature at from about 260° C. to about 300° C. until reaction is completed.

JOHN L. PORTER.

REFERENCES CITED

The following references are of record in the file of this patent:

UNITED STATES PATENTS

| Number | Name | Date |
|---|---|---|
| 2,000,052 | Thorpe et al. | May 7, 1935 |
| 2,153,300 | Dahlen et al. | Apr. 4, 1939 |
| 2,182,763 | Muehlbauer | Dec. 5, 1939 |
| 2,202,632 | Heilbron et al. | May 28, 1940 |
| 2,212,924 | Muehlbauer | Aug. 27, 1940 |
| 2,413,191 | Palmer et al. | Dec. 24, 1946 |

FOREIGN PATENTS

| Number | Country | Date |
|---|---|---|
| 799,901 | France | Apr. 20, 1936 |
| 482,387 | Great Britain | Mar. 29, 1938 |

OTHER REFERENCES

Linstead et al., J. Chem. Soc., London, (1934) pp.1022–1027.